United States Patent
Bantug

(10) Patent No.: US 11,733,934 B1
(45) Date of Patent: Aug. 22, 2023

(54) NEAR FIELD WIRELESS COMMUNICATION OF PRINTER JOB SETTINGS

(71) Applicant: KYOCERA Document Solutions Inc., Osaka, CA (US)

(72) Inventor: Klyve-Orsy Ortiz Bantug, La Mirada, CA (US)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/692,891

(22) Filed: Mar. 11, 2022

(51) Int. Cl.
- *G06F 3/12* (2006.01)
- *H04W 4/80* (2018.01)
- *H04N 1/00* (2006.01)

(52) U.S. Cl.
CPC .......... *G06F 3/1204* (2013.01); *G06F 3/1257* (2013.01); *H04N 1/00334* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 2012/0329386 | A1* | 12/2012 | Reyner | G06K 1/18 455/41.1 |
| 2019/0331363 | A1* | 10/2019 | Peng | F24H 9/2007 |
| 2020/0004469 | A1* | 1/2020 | Tomida | G06F 3/1287 |

* cited by examiner

*Primary Examiner* — Frantz Bataille
(74) *Attorney, Agent, or Firm* — W. Webostad

(57) ABSTRACT

Systems and methods relate generally to set up for a touchless use of a printing device, as well as touchless use thereof, are disclosed. In such a method, a printer driver programmed into a host computational device is accessed to display a user interface on a display device for input of job settings displayed via the user interface. A graphical user interface image of the user interface is displayed on the display device. The input of the job settings is accepted via the graphical user interface image. A quick response (QR) code is generated by the printer driver using the job settings for contents for the QR code. The QR code is displayed on the display device. The QR code is captured with a camera of a programmed mobile device. The QR code is converted into a near field communication (NFC) message by the programmed mobile device.

18 Claims, 10 Drawing Sheets

NEAR FIELD WIRELESS COMMUNICATION OF PRINTER JOB SETTINGS

FIELD

The following description relates to near field wireless communication of printer job settings. More particularly, the following description relates to near field wireless communication of printer job settings from a mobile device to a printing device.

BACKGROUND

Conventionally, printer job settings are communicated from a host computing device to a printing device via a network. Conventionally, a printer driver residing on such host computing device is used to select printer job settings for such a printing device.

SUMMARY

In accordance with one or more below described examples, a method relating generally to set up for a touchless use of a printing device is disclosed. In such a method, a printer driver programmed into a host computational device is accessed to display a user interface on a display device for input of job settings displayed via the user interface. A graphical user interface image of the user interface is displayed on the display device. The input of the job settings is accepted via the graphical user interface image. A quick response (QR) code is generated by the printer driver using the job settings for contents for the QR code. The QR code is displayed on the display device. The QR code is captured with a camera of a programmed mobile device. The QR code is converted into a near field communication (NFC) message by the programmed mobile device.

In accordance with one or more below described examples, a system relating generally to set up for a touchless use of a printing device is disclosed. In such a system, a host computational device and a mobile device each have: a memory configured to store program code; and a processor coupled to the memory. In combination and response to executing the program code, the host computational device and the mobile device are configured to initiate operations for implementing a set up flow for a printing device, including: accessing a printer driver programmed into the host computational device to display a user interface on a display device for input of job settings displayed via the user interface; displaying a graphical user interface image of the user interface on the display device; accepting the input of the job settings via the graphical user interface image; generating a quick response (QR) code by the printer driver using the job settings for contents for the QR code; displaying the QR code on the display device; capturing the QR code with a camera and an app of the mobile device; and converting the QR code into a near field communication (NFC) message by the app.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 2-1 is a pictorial diagram depicting an example of a display device having a graphical user interface (GUI) screen display/image of a user interface.

FIG. 2-2 is a pictorial diagram depicting an example of a display having another GUI screen display/image of a user interface.

FIG. 2-3 is a pictorial diagram depicting an example of a display having the GUI screen display/image of a user interface of FIG. 2-1 though after generation of an overlapping code window with a quick response (QR) code.

FIG. 2-4 is a pictorial diagram depicting an example of a programmed mobile device with a GUI screen display of an app.

FIG. 2-5 is a pictorial diagram depicting an example of programmed mobile device with another GUI screen display of an app.

FIG. 2-6 is a pictorial diagram depicting an example of a portion of a printing device with a mobile device in a state as shown in FIG. 2-5 for near field communication (NFC) communication.

FIG. 3-1 is a block diagram depicting an example of an NFC Data Exchange Format (NDEF) message field structure.

FIG. 3-2 is a state diagram depicting an example of an NDEF message use flow.

FIG. 4 is a pictorial diagram depicting an example of a network.

FIG. 5 is block diagram depicting an example of a portable communication device.

FIG. 6 is a block diagram depicting an example of a multi-function printer (MFP).

DETAILED DESCRIPTION

Figure 1:
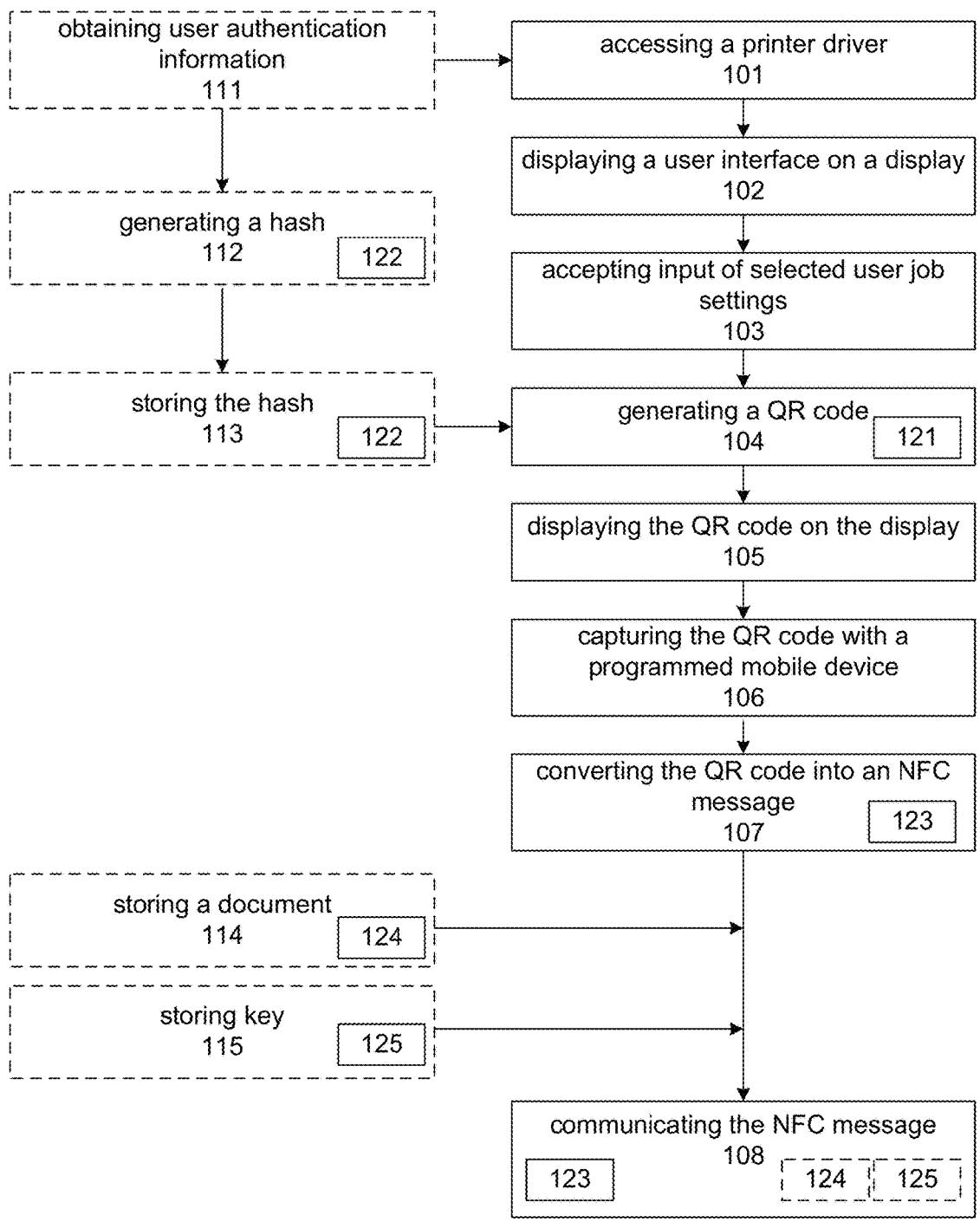
FIG. 1 is a flow diagram depicting an example of a touchless use set up flow for a printing device.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

A printer driver residing on a host computing device is conventionally connected to a printing device via a network. Through this connectivity, printer driver settings may be set in such printer driver for a printing device to use for execution of a printer job. However, connecting a printing device to a network for handshaking can be complicated, including, without limitation, switching from one network to another.

With the above general understanding borne in mind, various configurations for systems, and methods therefor, with using a mobile device for near field communication with a printing device are generally described below for providing printer job settings thereto.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1 is a flow diagram depicting an example of a touchless use set up flow 100 for a printing device. In this example, a printing device is a multi-function printer; however, in another example, another type of electronic device used for printing documents may be used.

At operation 101, a printer driver programmed into a host computational device may be accessed to display a user interface on a display for input of selected user job settings displayed via the user interface. Optionally, to obtain access to a printer driver, user authentication information 111 may be obtained by such a host computational device to limit access to such a printer driver. At operation 102, such a user interface may be displayed on such a display.

Figures 1, 2:
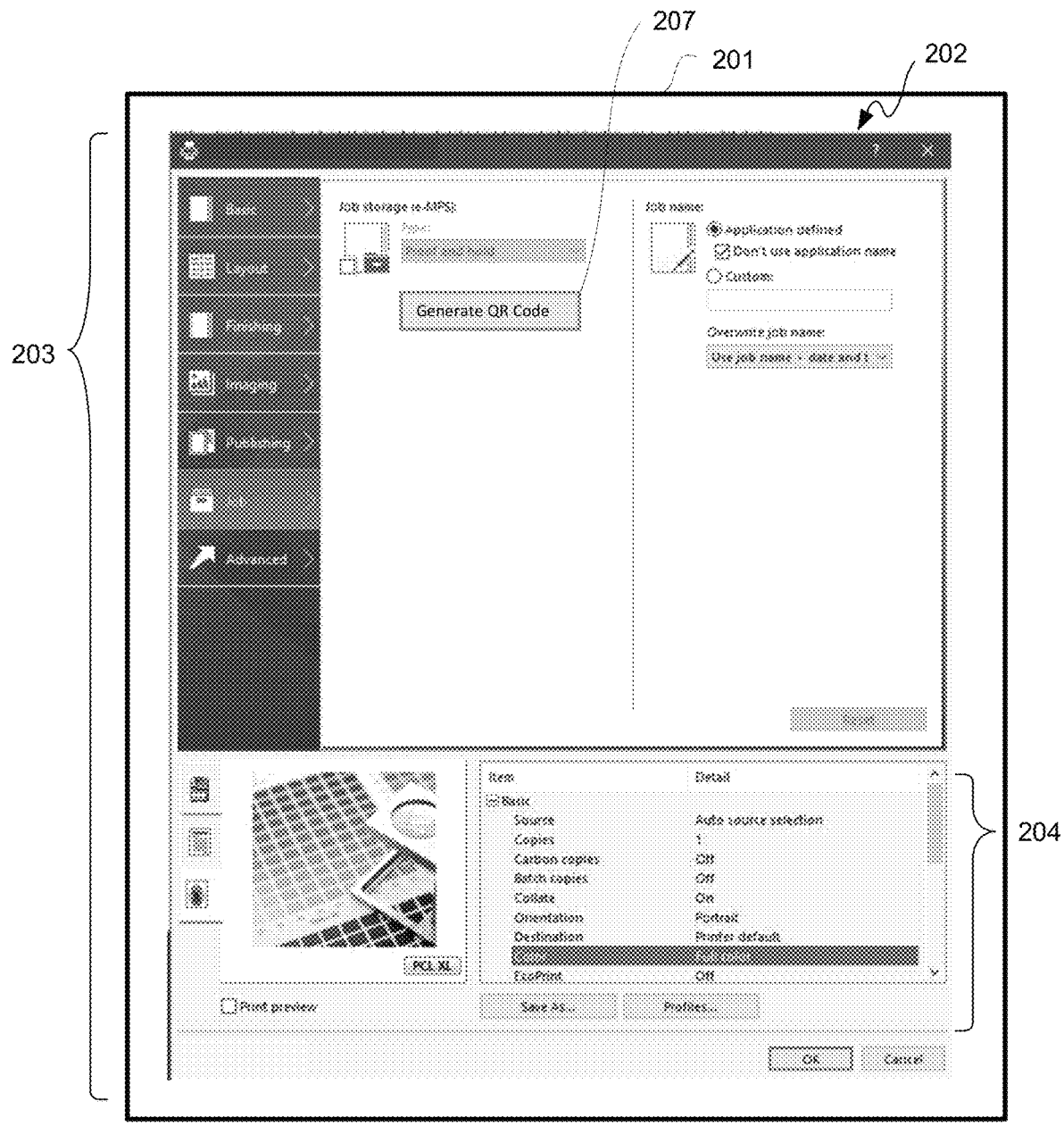
Figure 2:
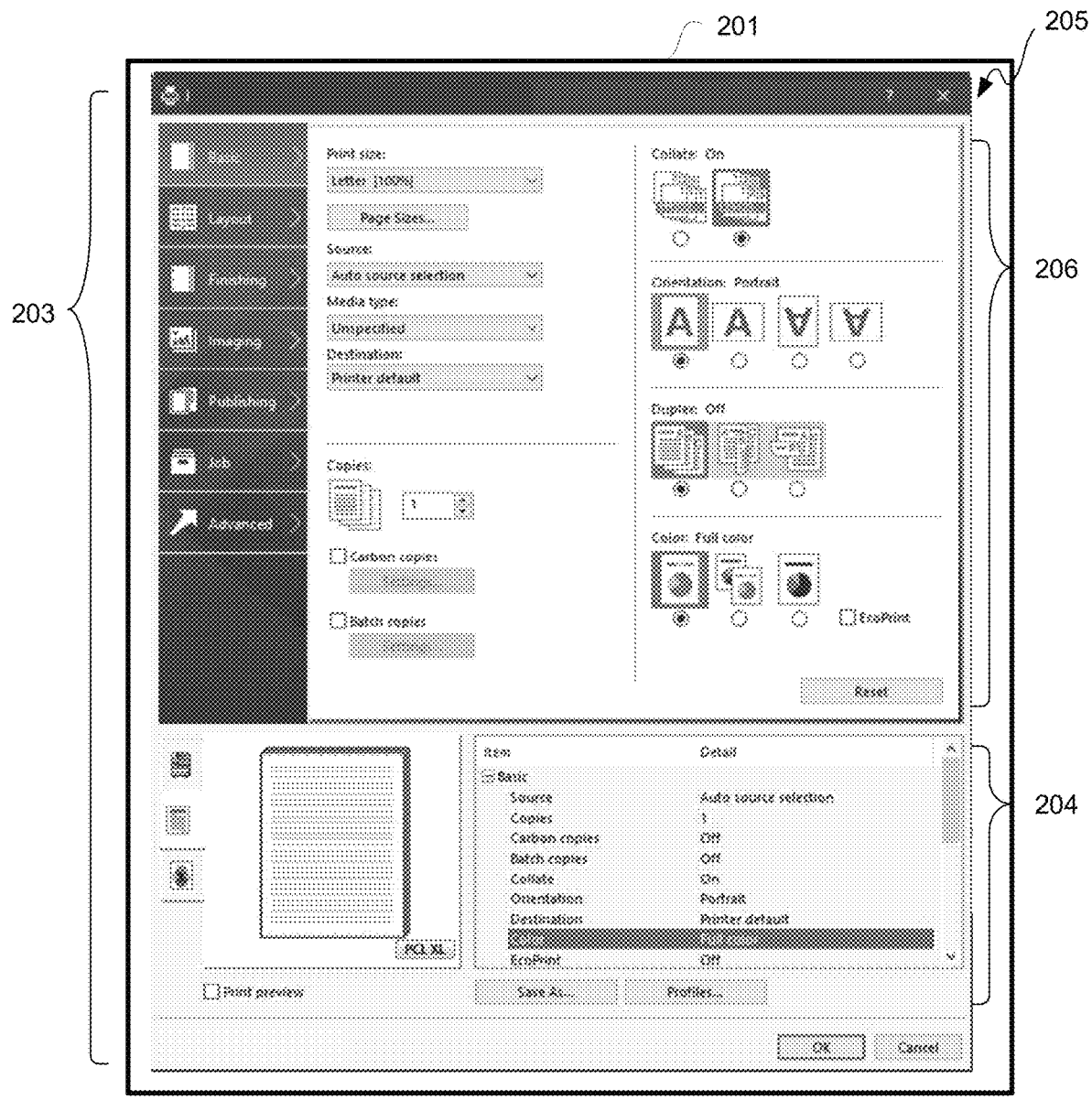

For purposes of clarity by way of example and not limitation, FIG. 2-1 is a pictorial diagram depicting an example of a display device ("display") 201, such as of a host computer system, having a graphical user interface (GUI) screen display/image ("display") 202 of a user interface 203 programmed into a printer driver of such a host computational device. FIG. 2-2 is a pictorial diagram depicting an example of a display 201 having a GUI screen display 205 of a user interface 203. With simultaneous reference to FIGS. 1 through 2-2, touchless use set up flow 100 is further described.

User interface 203 may include one or more user job settings 204 for a printer job for a printing device. Display 201 having a GUI screen display 205 of a user interface 203 may be for selection of user job settings 206. One or more of such user job settings 204 and/or 206 may be selectable by a user. At operation 103, input of one or more of such selected user job settings 204 may be accepted as input for a printer job.

A printer driver may be configured with a generate QR code button 207 as part of a user interface 203. At operation 104, a quick response or QR code 121 may be generated by such a printer driver using at least in part user selected job settings 204 and/or 206 for contents for such QR code generation. In this example, such QR code 121 is generated by a printer driver in response to selection by a user of generate QR code button 207. For example, in response to selecting or "pressing" generate QR code button 207, job settings 204 may be translated or coded into a QR code 121.

Figures 2, 3:
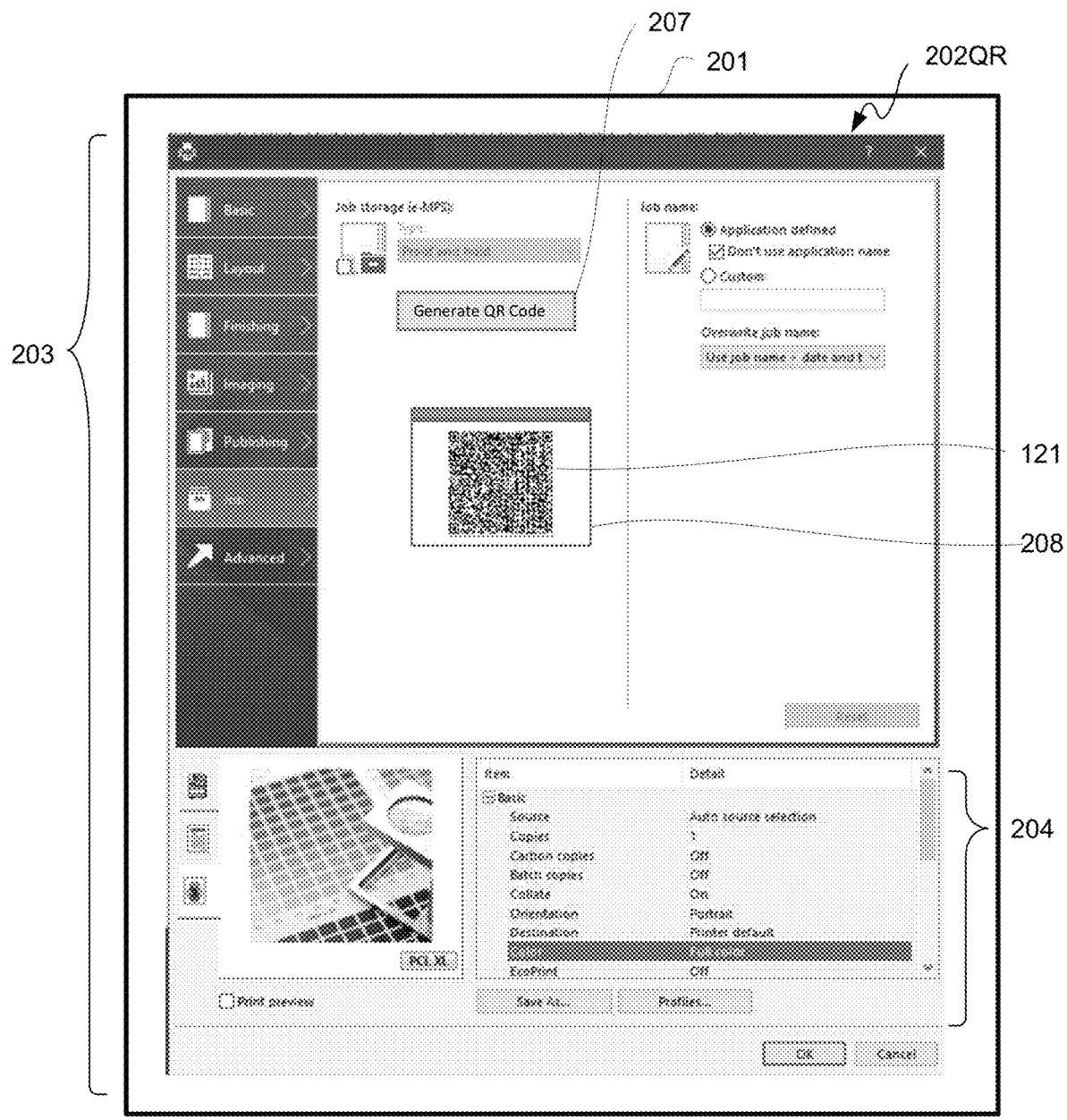

FIG. 2-3 is a pictorial diagram depicting an example of a display 201 having a GUI screen display 202QR of a user interface 203 after generation of a QR code 121. With simultaneous reference to FIGS. 1 through 2-3, touchless use set up flow 100 is further described.

At operation 105, a QR code 121 generated at operation 104 may be displayed on display 201. Optionally, a window 208 may be generated by user interface 203 overlapping GUI screen display 202QR for displaying therein QR code 121.

Optionally, at operation 112, user authentication information 111 may be hashed or otherwise encoded to generate a hash or other encoded token 122. Such hash 122 may optionally be stored at operation 113 for input to operation 104. Along those lines, hash 122 may optionally be used with job settings in generation of a QR code 121, and thus such hash may be stored in memory of a printing device.

Figures 2, 3, 4, 5:
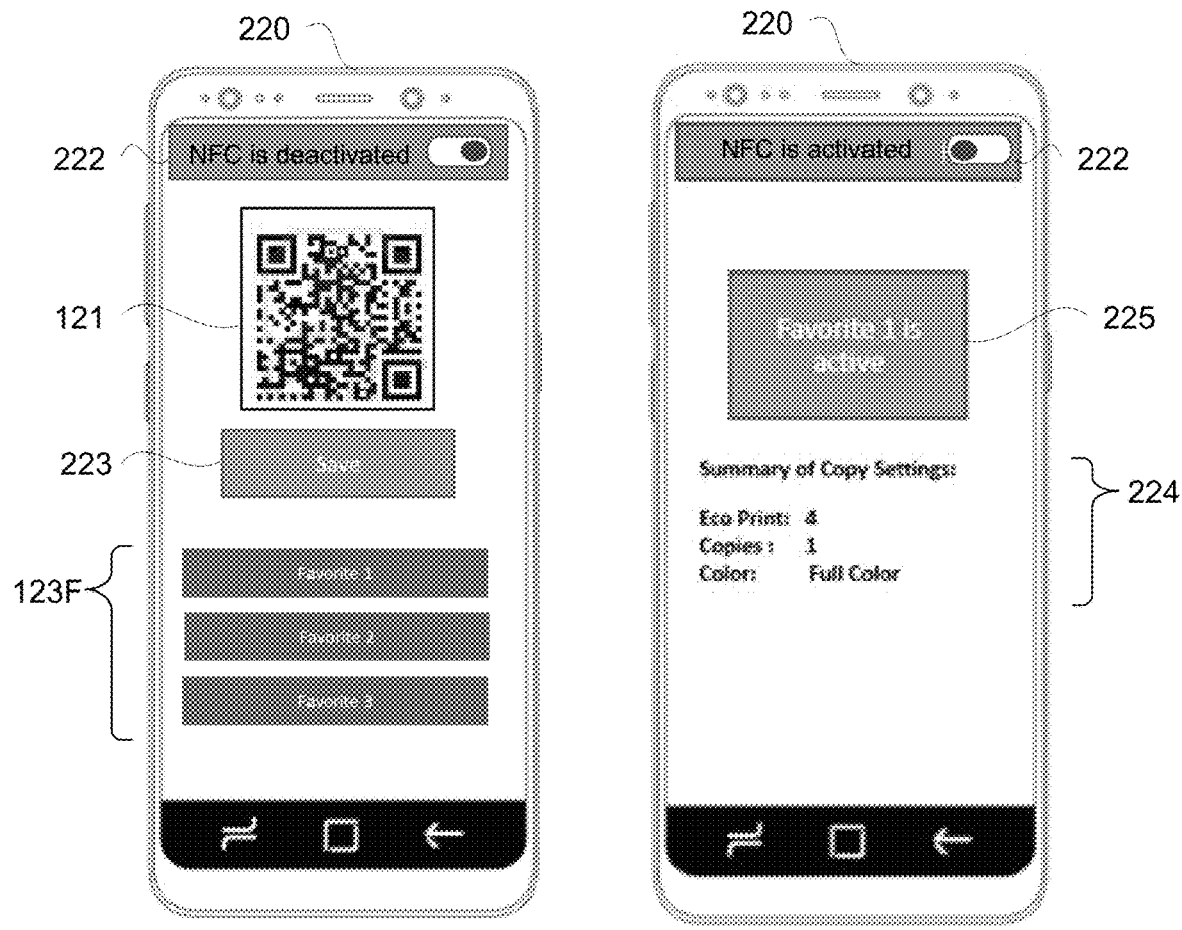

FIG. 2-4 is a pictorial diagram depicting an example of a programmed mobile device 220 with a GUI screen display 221 of an app. FIG. 2-5 is a pictorial diagram depicting an example of programmed mobile device 220 with a GUI screen display 222 of such an app. With simultaneous reference to FIGS. 1 through 2-5, touchless use set up flow 100 is further described. A mobile device 220 in this example is a smart phone; however, in another example, a mobile device 220 may be selected from a mobile phone, a notebook computer, or a computer tablet.

At operation 106, a QR code 121 image displayed at operation 105 may be captured via use of a save button 223 by mobile device 220. Along those lines, a mobile device 220 may include a camera and an associated application window used to take a digital photo of QR code 121. Mobile device 220 may be programmed with an app for capturing a QR code 121 and for activating or deactivating (toggle on/off) 222 near field communication (NFC). In this example, QR code capture 223 and NFC on/off toggle 222 are incorporated into an app for mobile device 220, where QR code capture and NFC may be known smart phone features.

In this example, save button 223 may be disabled at first. When there is a valid QR code 121 in a camera area therefor, save button 223 may be activated. A camera of mobile device 220 may automatically take a picture of a current QR code 121 identified in a camera area. Pressing an active save button 223 may then save information from such QR code 121 image or photo into a local database.

At operation 107, a captured QR code 121 may be translated or encoded into an NFC message 123 by programmed mobile device 220. In this example, three "favorite" job settings may be saved as three QR codes. However, in another example, such translation to an NFC message 123 may be performed with saving of a captured QR code 121. In this example, three "favorite" job settings may be saved as three corresponding NFC messages translated from corresponding QR codes 121 input. Furthermore, in another example fewer or more than three NFC messages or QR codes may be stored in a database in memory of mobile device 220 or in cloud storage accessible by mobile device 220.

Users can load up to a specific number of favorites or custom job settings in a mobile device app. If no favorite is currently loaded, pressing on one of favorite buttons 123F may allow a user select a list of saved information from a corresponding QR code or NFC message in a local database, such as saved at operation 107. If a favorite is currently loaded in a mobile device 220, pressing on a corresponding one of favorite buttons 123F may translate such QR code 121 into NFC Data Exchange Format (NDEF) message if not already translated or may que up an NFC message 123.

Responsive to selection of an NFC message 123, such NFC message 123 selected may be indicated by display of a favorite block 225 optionally with a summary of settings 224 for a printer job obtained from a corresponding QR code. In this example, a printer job is a copy operation. Pressing on a favorite button 123F in addition to opening into a window for displaying of favorite block 225, NFC communication may be activated. Opening of a selected favorite window may further cause operation 108, namely transmitting an NDEF message containing job settings, to take place.

Optionally, at operation 114 a document 124 or other content, such as an image, video, web-based markup text, and/or other content, may be stored in a mobile device 220 memory. Furthermore, optionally an encryption key 125 may be stored at operation 115 in a memory of a mobile device. As is known, a document or other content may be stored in an encrypted or unencrypted form. In this example, an encrypted form of a document is used; however, in another example an unencrypted form of a document may be used.

At operation 108, a touchless interaction with a printing device may be used to print, copy or otherwise produce a form of a stored document by communicating an NFC message 123 from mobile device 220 to a printing device. Communicated with such NFC message 123 may be a payload, including such stored document 124 and such stored key 125. For example, an NFC payload (an NDEF record) can carry up to 4 GB of information at a maximum transfer rate of only 424 kbit/s. Such NFC message 123 includes job settings for a printer job to produce such document, as previously described with regard to generation of a QR code.

At operation 108, an NFC message 123, and optionally a document 124 and a key 125, may be communicated to a printing device for executing a printer job for a document with corresponding job settings. At this point a touchless interaction may occur with a printing device by using NFC or other wireless communication.

FIG. 2-6 is a pictorial diagram depicting an example of a portion of a printing device 230 with a mobile device 220 in a state as shown in FIG. 2-5 for NFC communication. In this example, a user 231 holds mobile device 220 for touchless NFC communication with printing device 230, such as for operation 108. As used herein, "touchless" generally means not having to have any physical interaction with a front panel of a peripheral device, such as a printing device for example.

As generally indicated with ellipses, there may be multiple printing devices. However, because mobile device 220 includes printer job settings, as well as optionally a document for example, any of such printing devices may be used simply by walking up to such printing device with mobile device 220 for NFC communication as described herein. So for example, a printing device at a hotel lobby may be used with a mobile device 220 may be used. Along those lines, a user may have an electronic credential for using such hotel lobby printing device loaded into their mobile device 220 and communicated via NFC communication to such printing device. In the above example, such credential was a hash; however, other forms of electronic credentials may be used in other examples.

Such credential may further limit resources of a printing device useable by an associated user, such as limiting the number of pages to be printed per day. Along those lines, in another example, an NFC message may allow a user to access a port, such as for example a USB port, on a printing device, and then rather than communicating a document with such NFC message, a USB memory device having such document may be accessed by such printing device for execution of a printer job thereon. Such document may be stored in encrypted form on such USB memory device, and communicated into such printing device in encrypted form; however, such NFC message may include both printer job settings and a key for decrypting by such printing device such encrypted document. It should be appreciated that memory devices other than USB flash memory devices, as well as ports other than USB ports, may be used in other examples.

More generally, printing devices throughout any network may be used with proper credentials without having to be logged into a network and without having to know which printing device is going to perform a printer job. For example, multiple printing devices may be wirelessly networked on a IoT network without having to expose a more secure network, and then users may simply transport themselves and their mobile device up to a printing device to be used. This further simplifies having to form a handshake with a networked printing device, as a host computer device may simply have a printer driver operable to generate a QR code as previously described. Near field wireless communication may be used, such as in contrast to Wi-Fi for example, to avoid confusion on which printing device of multiple printing devices is to be used. Furthermore, near field communication may be used to avoid having to connect to a network, or more particularly reconnect to another network of a printing device. Furthermore, network connection credentials, for example a password protected network a printing device is on, may be avoided, as a user may simply connect to a printing device without having to access such a network. In other words, connection to a network in which a printing device is in may be avoided.

Along those lines, a printer driver can save custom settings or favorite settings and generate them into QR codes. These QR codes may then be displayed and scanned into a smartphone. From a smartphone, a printing device application thereof may then be used to generate NFC messages for such QR codes, and such NFC messages may be received by one or more printing devices.

FIG. 3-1 is a block diagram depicting an example of an NDEF message field structure 300. In this example, NDEF message field structure 300 includes an NFC-header field 301, a guest-login field 302, a function field 303, a number of copies field 304-1, m (for m a positive integer) other printer job settings fields 304-m, n (for n a positive integer) payload fields 305-1 through 305-n, and an NDEF terminator field 306.

Printer job settings may be loaded from a QR code into an NFC Data Exchange Format (NDEF) message or NFC message. In this example, the first three records or populated fields contain a fixed NFC header, a guest-login detail, and printing device function (e.g., copy, print or other function). Further information from a QR code regarding printer job settings may be populated into succeeding variable length job settings fields 304, such as for example a number of copies field 304-1, a color/monochrome field, a density field, an eco-print field, and so on. After job settings fields 304, there may be 1 to n payload fields 305 followed by an NDEF terminator field 306. This is just one example, and other structures may be used in other examples.

Figures 2, 3, 4, 5, 6:
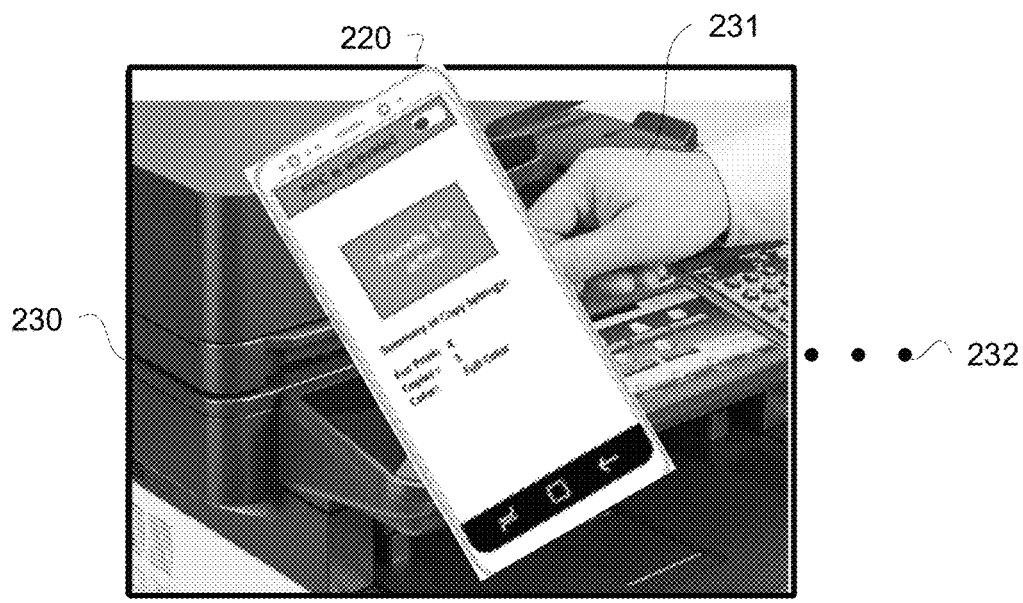
Figures 1, 3:
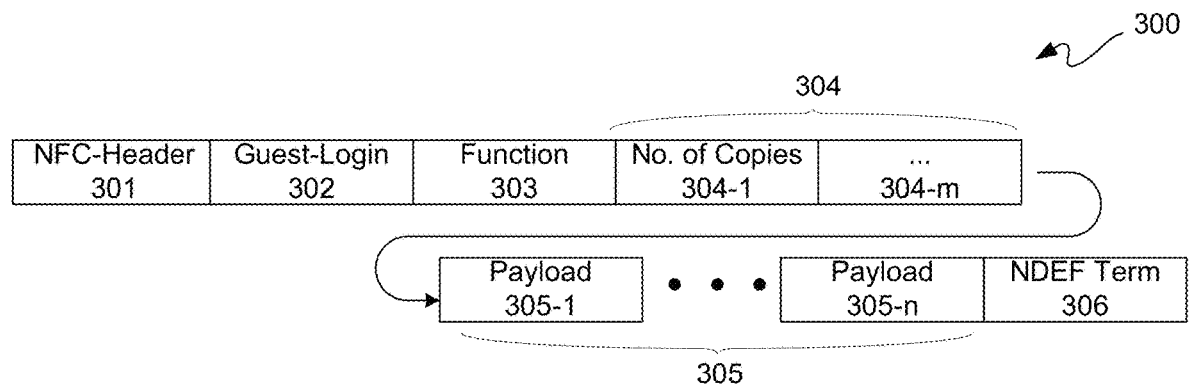
Figures 2, 3:
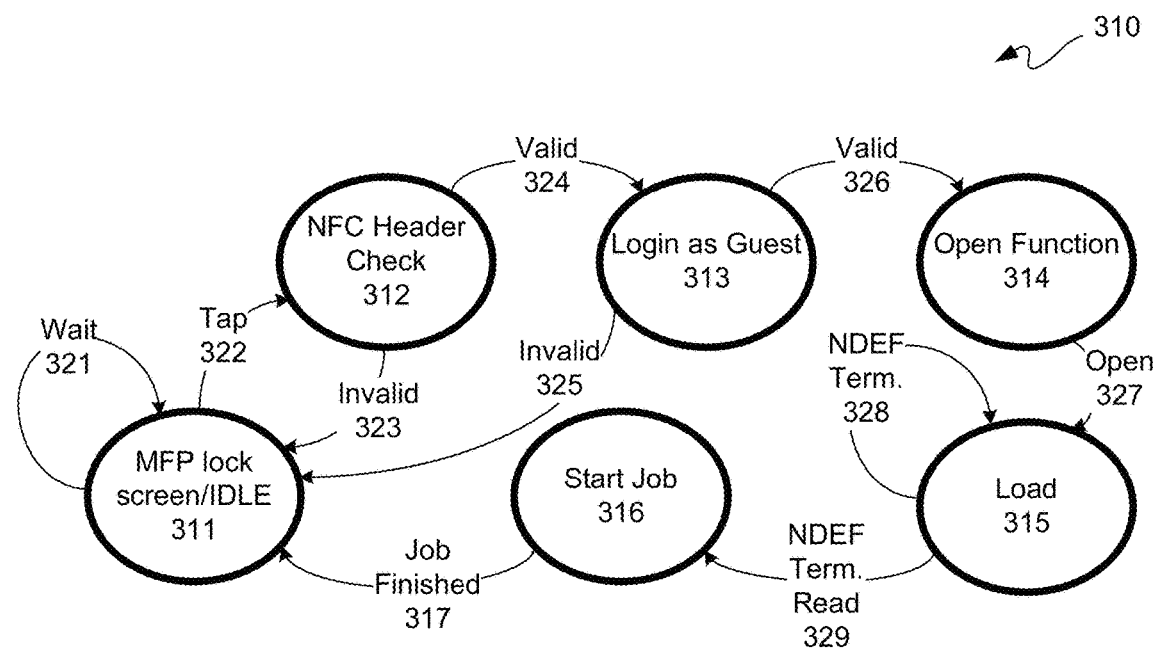
Figure 4:
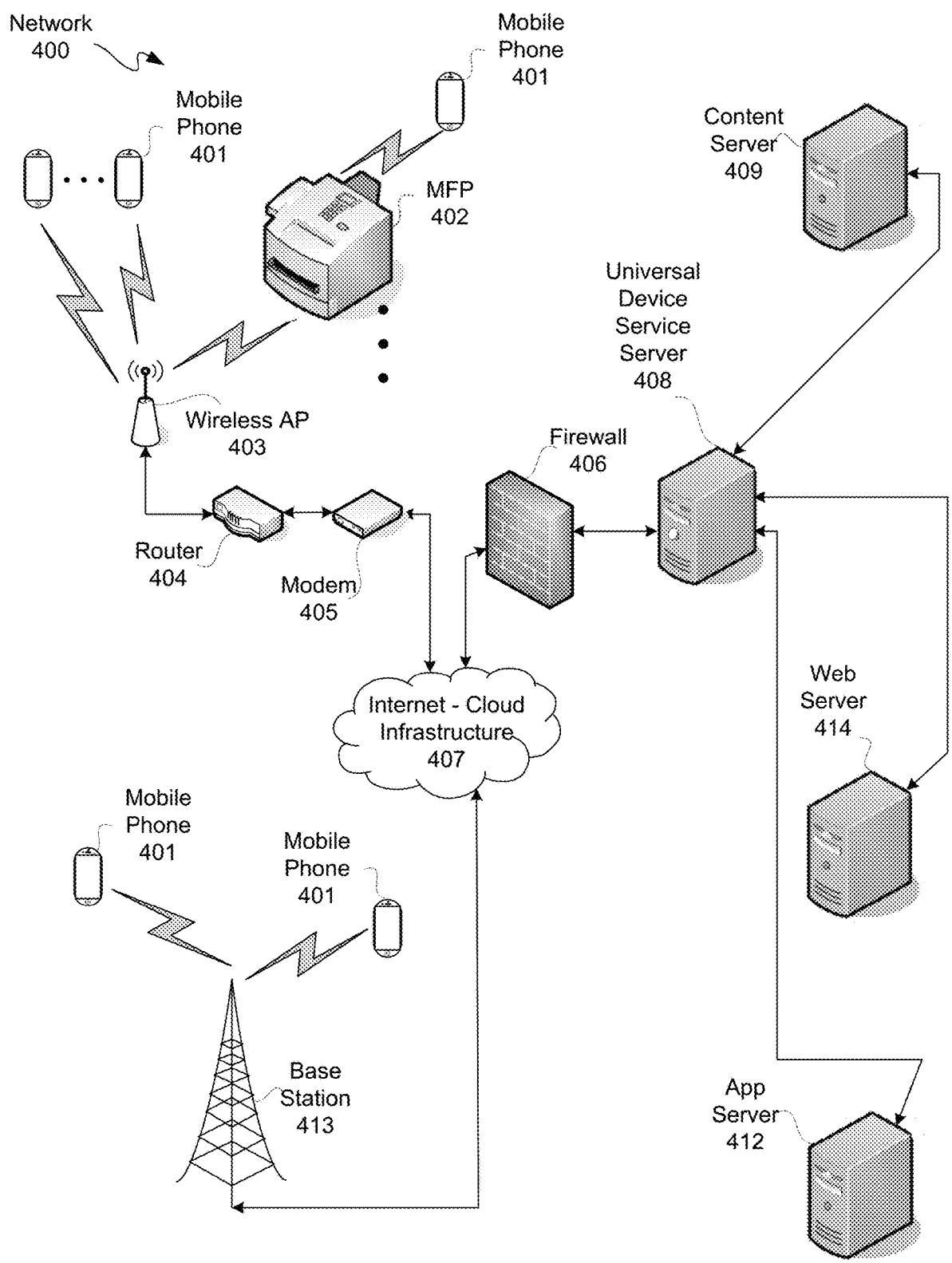
Figure 5:
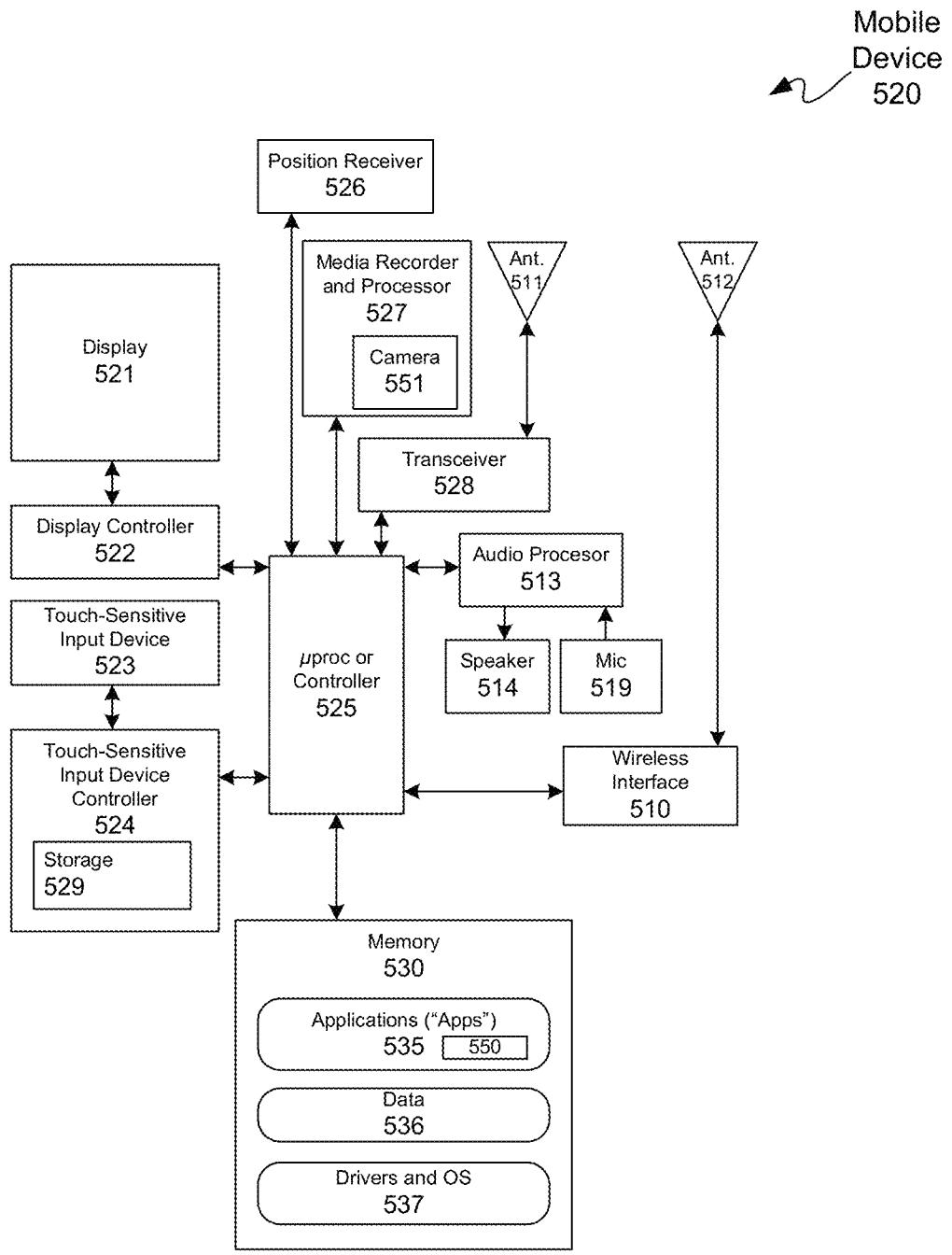
Figure 6:
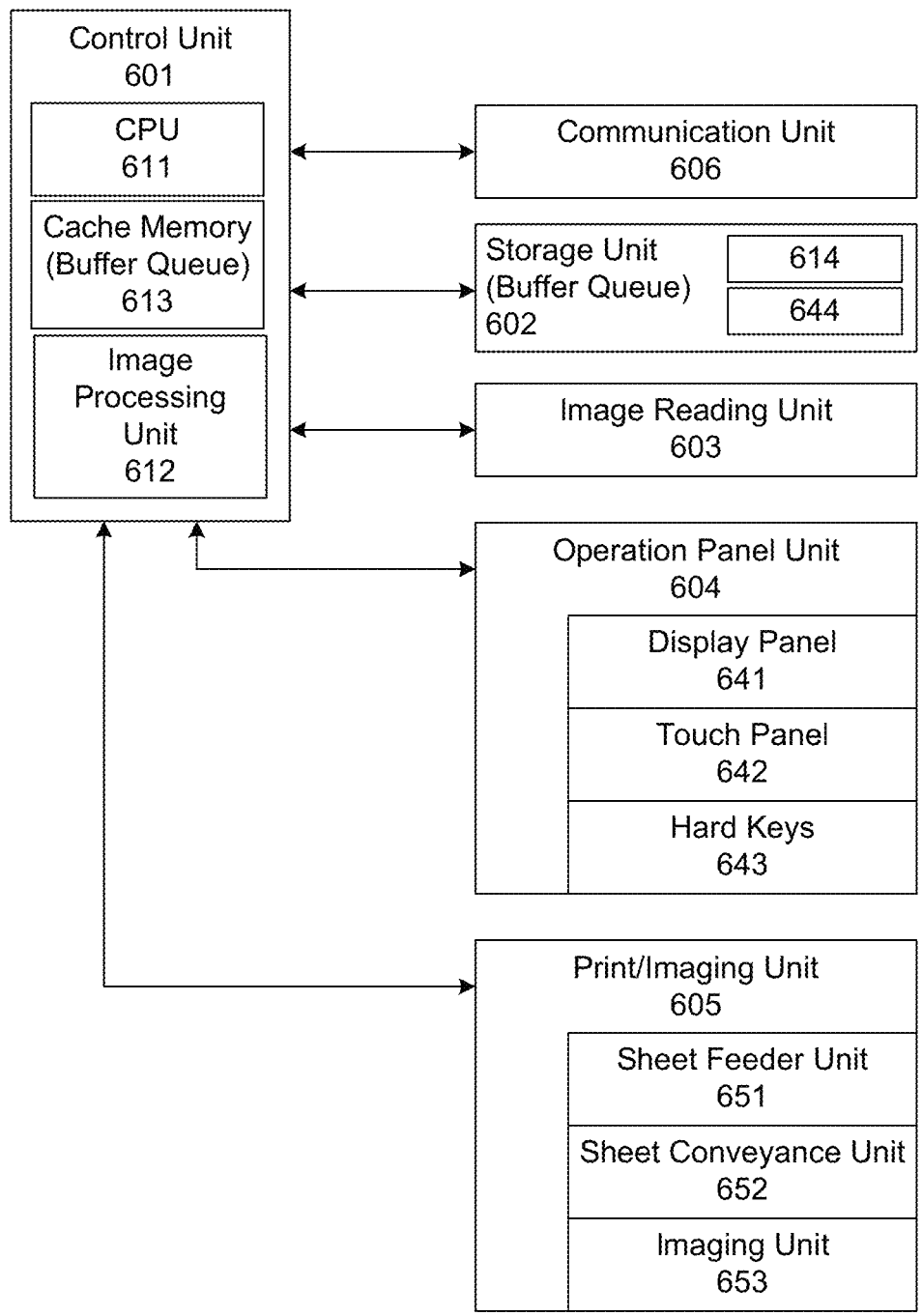

With continuing reference to NDEF message field structure 300 of FIG. 3-1, as well as simultaneous reference to FIGS. 1 through 2-6, the state diagram depicting an example of an NDEF message use/printer job settings flow 310 of FIG. 3-2 described. NDEF message use/printer job settings flow 310 may be implemented as an app of or programmed into a printing device for example.

At state 311, a printing device, which in this example is an MFP for purposes of clarity and not limitation, has a display panel or touch screen locked, and such MFP is in an idle mode. MFP is in a wait state 321 while in such idle mode. Responsive to an NFC communication, such as for example a tap 322 with a mobile device 220, such MFP transitions from idle mode or state 311 to NFC header check state 312.

If an MFP determines an NFC header from field 301 is invalid 323 for state 312, then such MFP transitions from check state 312 back to idle state 311. If, however, at check state 312 it is determined that an NFC header is valid 324, then MFP may transition from check state 312 to login as guest state 313. If guest login information from field 302 is determined by MFP at state 313 to be invalid 325, then MFP returns to idle state 311. If, however, guest login information is determined to be valid 326, then MFP transitions from login state 313 to open function state 314. In state 314, MFP opens a function identified in field 303, which for purposes of clarity by way of example and not limitation is assumed to be a print function.

Responsive to opening 327 a function, MFP transitions from state 314 to load state 315. In load state 325, MFP load printer job settings from fields 304, and, if present, any and all payload from one or more of fields 305. While in load state 315, MFP looks or checks 328 for an NDEF terminator from field 306. Once an NDEF terminator is read 329 by an MFP, then all printer job settings, and all payload, if any, has been loaded. In response, MFP transitions from a loading state 315 to a start printer job state 316. Such started printer job may continue until such printer job is finished 317. Upon finishing, MFP may transition from job execution state 316 back to idle state 311

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

FIG. 5 is block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data. Apps 535 may include an app 550 for capturing a QR code and converting such QR code into an NFC message, as well as storing one or more QR codes or NFC messages, as described above in additional detail.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera 551, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer imaging pipeline program 614 and an NFC printer job settings app 644, as described above in additional detail. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
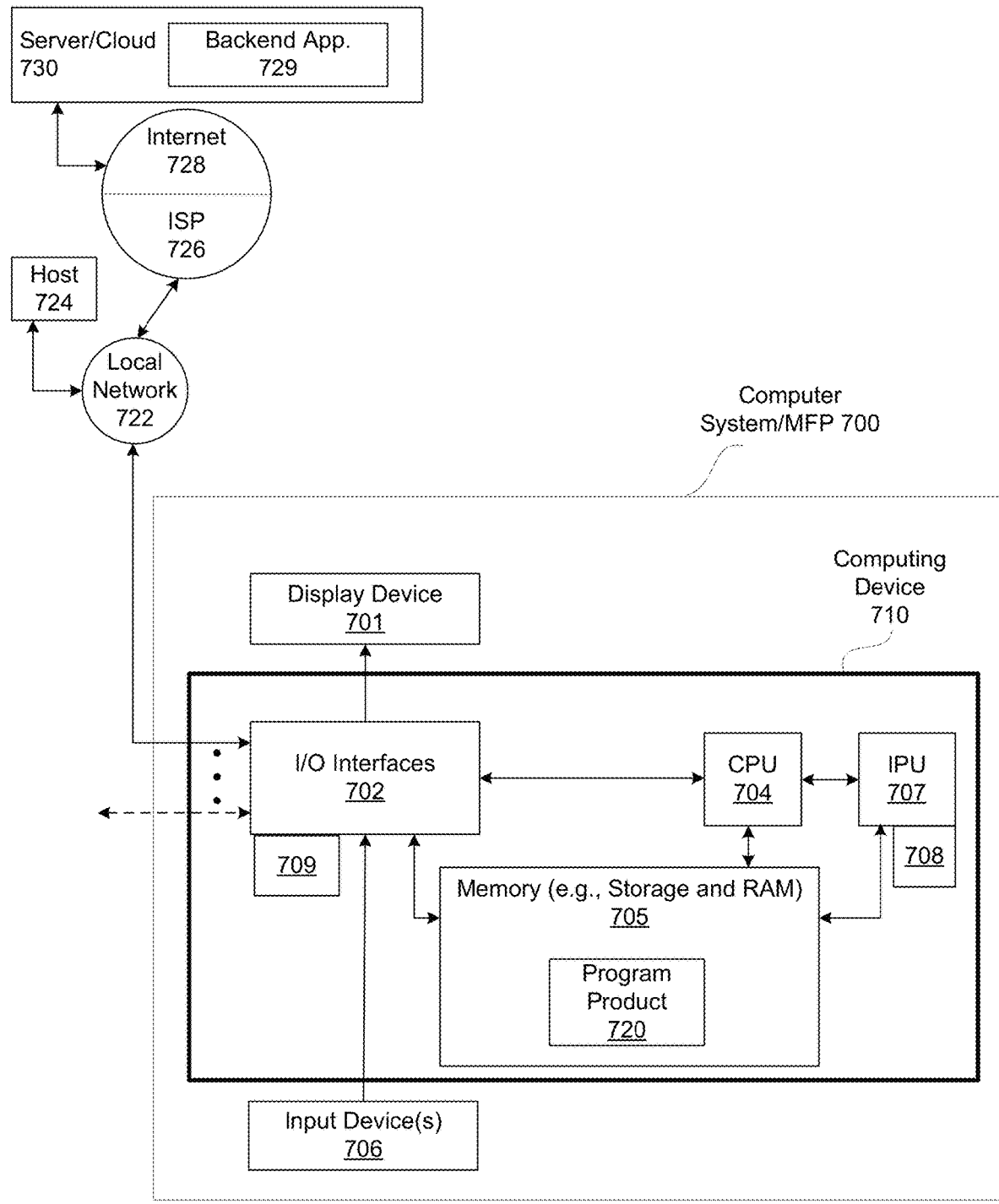
FIG. 7 is a block diagram depicting an example of a computer system.

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. For example, program product 720 may include a printer driver as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wide-band code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for touchless use of a printing device, comprising:
   accessing a printer driver programmed into a host computational device to display a user interface on a display device for input of job settings displayed via the user interface;
   displaying a graphical user interface image of the user interface on the display device;
   accepting the input of the job settings via the graphical user interface image;
   generating a quick response (QR) code by the printer driver having been programmed into the host computational device and using the job settings for contents for the OR code;
   displaying the QR code on the display device;
   capturing the QR code with a camera of a mobile device programmed with an app; and
   converting the QR code into a near field communication (NFC) message by the app of the mobile device; and
   communicating the NFC message with a printer job to the printing device to execute the printer job with the job settings.

2. The method according to claim 1, further comprising, obtaining user authentication information for the accessing of the printer driver, and
   generating a hash of the user authentication information.

3. The method according to claim 2, further comprising:
   generating the QR code by the printer driver using the job settings and the hash to provide the contents for the QR code.

4. The method according to claim 2, wherein the mobile device is selected from a mobile phone: a notebook computer, or a computer tablet.

5. The method according to claim 2, further comprising:
   storing a document on the mobile device; and
   communicating the document in the NFC message for executing the printer job for the document with the job settings.

6. The method according to claim 2, further comprising transmitting a decryption key in the NFC message to the printing device.

7. The method according to claim 6, wherein the NFC message provides user access to a port of the printing device.

8. The method according to claim 7, wherein the NFC message is of an NFC Data Exchange Format (NDEF).

9. The method according to claim 8, wherein the NDEF has a structure including a header field, a guest login field, and a printer function field followed by a plurality of settings fields for the job settings and ending with a terminator field.

10. The method according to claim 9, wherein the structure further includes a plurality of payload fields between the plurality of settings fields and the terminator field.

11. A system, comprising:
    a host computational device and a mobile device each having,
      a memory configured to store program code; and
      a processor coupled to the memory;
    wherein, in combination and response to executing the program code, the host computational device and the mobile device are configured to initiate operations for implementing a set up flow for a printing device, including:
      accessing a printer driver programmed into the host computational device to display a user interface on a display device for input of job settings displayed via the user interface;
      displaying a graphical user interface image of the user interface on the display device,
      accepting the input of the job settings via the graphical user interface image,
      generating a quick response (QR) code by the printer driver having been programmed into the host computational device and using the job settings for contents for the QR code,
      displaying the QR code on the display device;
      capturing the QR code with a camera and an app of the mobile device;
      converting the QR code into a near field communication (NFC) message by the app; and
      communicating the NFC message with a printer job to the printing device to execute the printer job with the job settings.

12. The system according to claim 11, wherein the set up flow further includes: obtaining user authentication information for the accessing of the printer driver; and generating a hash of the user authentication information.

13. The system according to claim 12, wherein the set up flow further includes generating the QR code by the printer driver using the job settings and the hash to provide the contents for the QR code.

14. The system according to claim 12, wherein the set up flow further includes:
    storing a document in the memory of the mobile device; and
    communicating the document in the NFC message for executing the printer job for the document with the job settings.

15. The system according to claim 12, wherein the set up flow further includes transmitting a decryption key in the NFC message to the printing device.

16. The system according to claim 15, wherein:
    the app is a first app;
    the printing device is programmed with a second app; and
    the second app is configured for processing the NFC message communicated.

17. The system according to claim 16, wherein the processing of the NFC message comprises:
    waiting for a tap initiate receiving of the NFC message;
    checking a header of the NFC message; and logging In as a guest of the printing device for further processing of the NFC message.

18. The system according to claim 17, wherein the further processing of the NFC message comprises:
   opening a function of the printing device,
   loading the job settings; and
   starting execution of the printer job.

* * * * *